Figure 1:
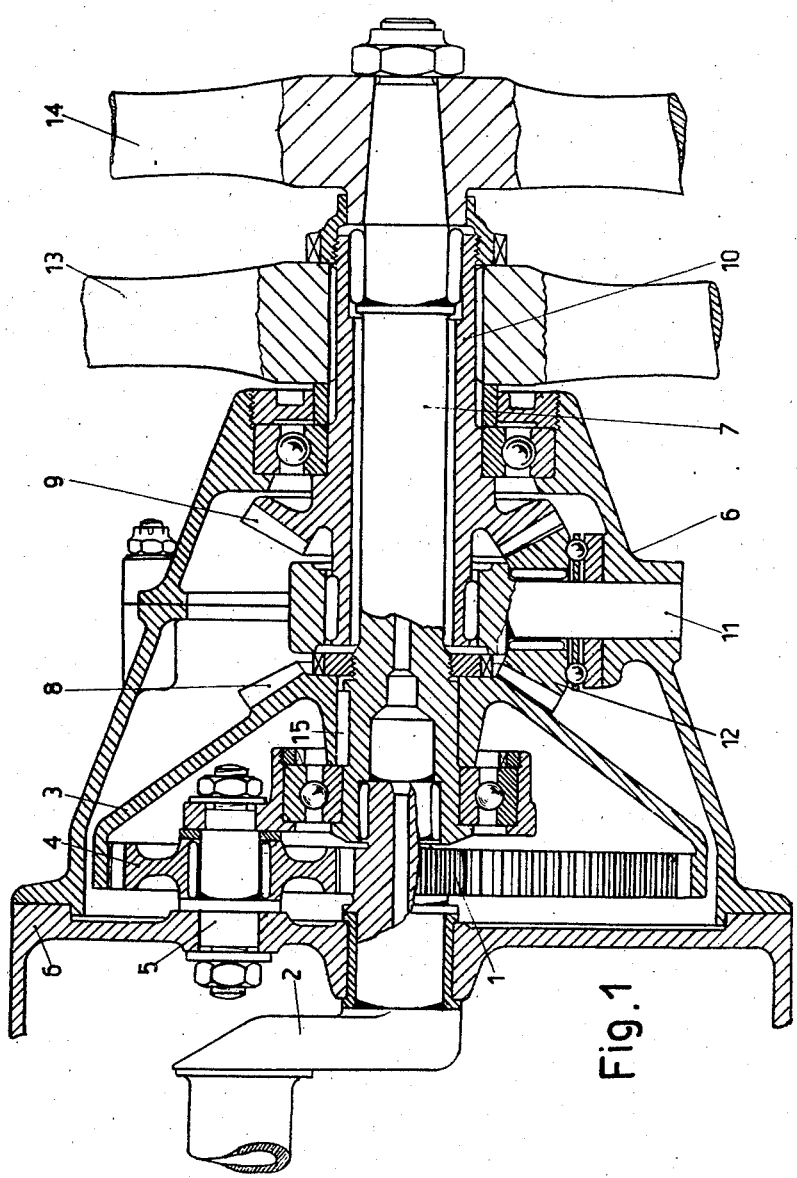

Feb. 13, 1940.   G. CAPRONI   2,190,254
COAXIAL PROPELLER DRIVE
Filed March 19, 1938   3 Sheets-Sheet 1

Feb. 13, 1940.   G. CAPRONI   2,190,254
COAXIAL PROPELLER DRIVE
Filed March 19, 1938   3 Sheets-Sheet 3

Gianni Caproni
by
Morrison, Kennedy + Campbell
attorneys.

Patented Feb. 13, 1940

2,190,254

UNITED STATES PATENT OFFICE 2,190,254

COAXIAL PROPELLER DRIVE

Gianni Caproni, Milan, Italy

Application March 19, 1938, Serial No. 196,862
In Italy March 25, 1937

10 Claims. (Cl. 184—6)

This invention relates to coaxial propeller drives, the object being to permit the drive, with one motor only, of two coaxial propellers which turn synchronously in opposite directions, and to provide effective lubrication therefor.

For the purpose of balancing the driving torque, it is known to employ for aircraft and watercraft two coaxial propellers which turn in opposite directions. One plan was to drive the two propellers by two independent engines placed the one behind the other, the shafts of which being disposed concentrically, one within the other. By such plan each propeller turns independently with a speed which may continually vary with respect to that of the other, and one of them might even stop while the other continues in rotation. Therefore balance of torque was attained only at those times when the two speeds were equal. Moreover, the use of such plan in aeronautics will not be possible, syncronism between propellers being lacking, to permit of firing projectiles through the area or circle which the propellers describe. This defect has been cured by gearing together the concentric shafts to turn oppositely at identical speeds, and driving them from the same source of power or a single engine. In either case, with the propellers independently or synchronously driven, a distinct problem existed in the essential matter of lubrication, especially at the outer bearing point, between the shafts, near the propellers.

The present invention solves the problem of effective lubrication and thus makes it practical to have full synchronism between the propellers. The illustrative disclosure is of the preferred type comprising a single motive source or driving means, with means for the transmission of the drive to the two propellers having the same rotation axis, in such a way that the propellers will turn in opposite directions with always the same angular speed; means for speed reduction between the driving means and the driven elements being understood.

The inventive conception may allow of various embodiments comprised within its scope of the invention; three specific forms being illustrated, by way of examples and not in a limitative sense, in the annexed drawings. The invention solves the described problem of lubricating the mutual bearing means disposed between the coaxial parts that rotate in opposed directions.

In the drawings,

Fig. 1 is an axial section through a first form of drive, in which the driving shaft and the two propellers have the same rotation axis.

Figure 2:
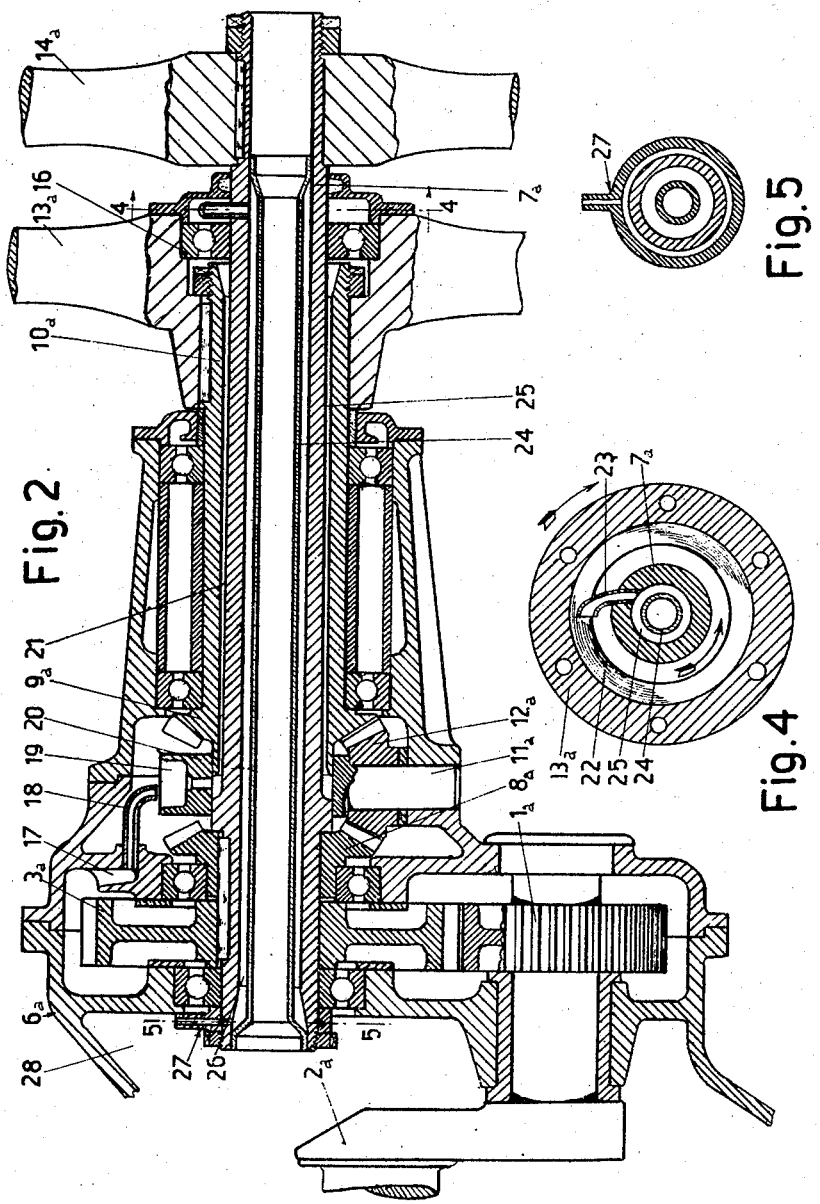
Figure 3:
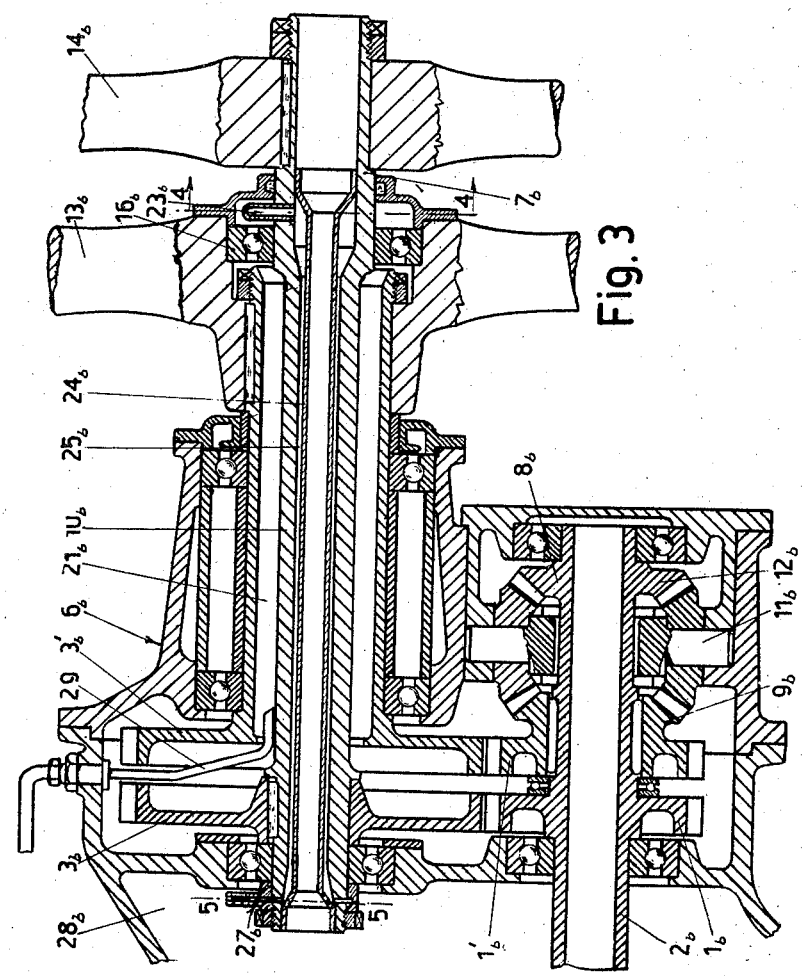

Figs. 2 and 3 in similar section show two modified forms in which the common rotation axis of the two propellers is parallel to that of the driving shaft.

Figs. 4 and 5 are partial cross sections taken respectively along the lines 4—4 and 5—5 of Figs. 2 and 3.

Before describing the details of construction the invention in its complete form may be outlined in general terms as follows. It pertains to the driving in opposite directions of two propellers mounted adjacently in tandem at the respective ends of inner and outer coaxial shafts 7 and 10 which have a mutual bearing 16 between them near the propeller ends of the shafts. The invention consists of a lubricating system therefor comprising cooperating elements serving to conduct lubricant from a source to and from the bearing parts between the shafts. One of these elements is the longitudinal supply passage 21 which is exterior to the inner shaft and conducts the lubricant from the source at the left or drive end of the mechanism to the bearing. The lubricant flow through the supply passage commences under a slight gravity head and is continued as forced flow by the other elements to be described. Beyond the longitudinal supply passage and bearing is an annular chamber 16x, receiving the lubricant flowing from the bearing and serving to collect the lubricant in the form of a rotating annulus centrifugally produced and maintained. This is a closed chamber which surrounds the inner shaft and the walls of which rotate with one of the shafts, preferably the outer shaft, the lubricant thereby rotating in the same direction as the outer shaft as an annular liquid body, accumulating near the outer wall of the chamber. The momentum of such lubricant annulus is utilized for the continuous tapping of lubricant therefrom and its return back toward the source. The tapping device or scoop 23 rotates with one shaft, in this case the inner shaft, therefore oppositely to the lubrication rotation, and, it extends into the path of the lubricant, with its mouth properly disposed, so that the relative motions give forcible tapping of the liquid, causing it to flow centripetally from the annular chamber through a short passage into the interior of the hollow inner shaft. The bore within the inner shaft is utilized as a return passage 25, being preferably between the wall of the inner shaft and an interior tubular liner 24. The return lubricant therefore flows leftward toward the source, and its return flow is shown further promoted by a centrifugal forceing means or passage 27 extending outwardly from the return passage and delivering eventually to the source.

Coming to the details of structure Fig. 1 shows a pinion 1 which is carried and turned by the driving crank shaft 2 and which pinion drives, at a suitable ratio, the internally toothed gear 3, namely, through the planet gears 4, the journals or axles 5 of which are fixed upon the casing 6 of the device. The gear 3 is fast with the inner propeller shaft 7 and with a sun or central gear 8 which by means of planet wheels 12 is operatively geared to a corresponding gear 9. The gears 8, 12 and 9 are shown as bevel gears. The planets 12 are mounted by axles 11 upon a planet carrier or bearing constituting part of the fixed casing 6. The gear 9 is fast with the hollow outer propeller shaft 10. The two propellers are shown at 13 and 14, with their hubs on the outer and inner shafts respectively.

The movement of the drive shaft 2 is transmitted through gears 1, 4 and 3, and key 15, to the inner shaft 7 and propeller 14; while through the train 1, 4, 3, 8, 12 and 9 it is transmitted with a reversal of direction, to the shaft 10 and propeller 13. It is to be understood that there are provided, in usual ways, suitable ball or roller bearings, as shown, and in general all devices called for by the technical rules for such constructions.

In the embodiment of Fig. 2, the parts corresponding to Fig. 1 are indicated by the same numbers with exponent "a" added. The drive shaft 2ª is parallel but offset with respect to the propeller axis. The pinion 1ª, turning with the shaft 2ª, is in mesh with the gear 3ª keyed on the inner shaft 7ª, on the end of which the propeller 14ª is mounted. Fast with the shaft 7ª, is the sun gear 8ª which, through the planet gears 12ª, transmits the rotation in the opposite direction and with an equal angular velocity, to the gear 9ª, which in turn is fast with the outer shaft 10ª, coaxial with the shaft 7ª and carrying the propeller 13ª. The bearing of the journals 11ª, which carry the planet wheels 12ª, is rigid with the casing 6ª.

Ball or other bearings may be variously arranged, for example as shown. The bearing 16, between the shafts near the propeller ends thereof, is in a particularly inaccessible position for lubrication for the reason that the outer ring of the bearing partakes of the revolution of the propeller 13ª, while its inner ring partakes of that of the propeller 14ª, and there is shown a lubrication system for this bearing which forms an essential part of the present invention. This bearing is subjected to a high effective velocity of rotation which is the sum of the velocities of the two propellers; besides which its lubrication is rendered more difficult by the fact that it has no fixed element or support from which it can readily receive lubrication oil or to which it could discharge the same. The lubrication system according to the present invention effectuates a continuous and reliable circulation of oil through the bearing, under control and without excessive flow.

The oil, thrown off by the gears in rotation, within the fixed casing, reaches the fixed pocket 17. From this source by gravity the oil is lead with slow flow or drop by drop, by the pipe or passage 18, into a supply basin 19 provided at the top of the planet carrier member 20. Thence the oil descends into the space 21 constituting a longitudinal supply passage provided between the propeller shafts 7ª and 10ª. Being drawn rearwardly, aided if desired by a helicoidal groove or vane in the passage, the oil flows to and through the ball bearing 16. Promoted by the centrifugal force, see also Fig. 4, the oil assumes the form of a ring 22, the inner diameter of which will at first gradually diminish as oil flows in, until reaching the tapping means. This is shown as comprising one or more small tubes or scoops 23, preferably curved, forming a dynamic oil tapping device, which acts to scoop off the rotating oil and conduct it inwardly through a small passage into the interior of the inner shaft 7ª. As the oil annulus and the tapping tube revolve in opposite directions the centrifugal force tending to oppose the centripetal movement of the oil is overcome by the dynamic force of the liquid.

Within the inner shaft 7ª, and preferably fixed to the same, is arranged a liner, sleeve or tube 24 between which and the shaft is an annular return passage or chamber 25 extending forwards preferably for the whole length of the shaft 7ª. The oil flows under force through this return passage until, reaching the front end 26, it is acted on by a forcing means, as a centrifugal passage or pump 27, see Fig. 5, which, by means of centrifugal force, draws out the oil from passage 25 and splashes it into the interior space 28 of the casing 6ª. The oil can be kept in circulation still more actively, if desired, by suitable supplemental suction or similar means. The oil thus is brought back to its source.

In the embodiment shown in Fig. 3, the parts which are equivalent to those shown in Fig. 2 are indicated by the same reference numbers but with the exponent "b". The driving shaft 2ᵇ is fast with a reducing pinion 1ᵇ, and with a planet wheel 8ᵇ; the other wheel 9ᵇ is fast with a second reduction pinion 1'ᵇ. The support of the journals 11ᵇ which carries the planets 12ᵇ is fixed on the casing 6ᵇ. The two reduction pinions 1ᵇ, 1'ᵇ, respectively drive directly, and in the desired ratio, the toothed wheels 3ᵇ, 3'ᵇ, which are fast respectively with the inner shaft 7ᵇ and with the outer shaft 10ᵇ, which carry the propellers 14ᵇ and 13ᵇ. The lubrication device is equivalent to that before described, with the modification that the oil reaches the supply passage 21ᵇ by a descending pipe 29 which is connected in any suitable way with the lubrication system of the engine.

In practice, further modifications of construction as well as of practical application can be made within the scope and intention of the invention, without departing from the essence thereof.

What I claim and desire to secure by United States Letters Patent is:

1. In apparatus for driving coaxial propellers in opposite directions by means of concentric shafts having oppositely rotating cooperating bearing parts, a lubricating system comprising a source of lubricant, means including a supply passage for conducting the lubricant to the bearing parts between said propeller shafts, means rotating with one of said shafts wherein the lubricant after passing through the bearing parts is collected in the form of an annulus centrifugally produced as a result of such rotation, means for tapping the lubricant from said annulus, and a return passage through which the lubricant is returned to the source; the means for tapping the lubricant including a projecting nozzle arranged to rotate in a direction opposite to the annulus rotation and communicating with the return passageway.

2. A lubricating system according to claim 1, wherein the passage for conducting the lubricant to the bearing parts includes an annular space between the concentric propeller shafts, and wherein the means for collecting the lubricant in the form of an annulus comprises a closed chamber surrounding the inner shaft and rotating with one of the shafts.

3. In apparatus for driving coaxial propellers in opposite directions by means of concentric shafts having oppositely rotating cooperating bearing parts, a lubricating system comprising a source of lubricant, means including a supply passage for conducting the lubricant to the bearing parts between said propeller shafts, means rotating with one of said shafts wherein the lubricant after passing through the bearing parts is collected in the form of an annulus centrifugally produced as a result of such rotation, means for tapping the lubricant from said annulus, and a return passage through which the lubricant is returned to the source; the return passage through which the lubricant is returned to the source comprises an internal bore within the inner of the concentric propeller shafts.

4. In apparatus for driving coaxial propellers in opposite directions by means of concentric shafts having oppositely rotating cooperating bearing parts, a lubricating system comprising a source of lubricant, means including a supply passage for conducting the lubricant to the bearing parts between said propeller shafts, means rotating with one of said shafts wherein the lubricant after passing through the bearing parts is collected in the form of an annular centrifugally produced as a result of such rotation, means for tapping the lubricant from said annulus, and a return passage through which the lubricant is returned to the source; the inner propeller shaft being hollow and provided internally with a tubular liner, and the return passage consisting of the annular space between the wall of said inner shaft and the wall of said internal liner.

5. In apparatus for driving coaxial propellers in opposite directions by means of concentric shafts having oppositely rotating cooperating bearing parts, a lubricating system comprising a source of lubricant, means including a supply passage for conducting the lubricant to the bearing parts, means rotating with one of said shafts wherein the lubricant after passing through the bearing parts is collected in the form of an annulus centrifugally produced as a result of such rotation, means for tapping the lubricant from said annulus, a return passage through which the lubricant is returned to the source, and a centrifugally operating device rotated by the inner shaft for drawing the lubricant through the return passage and for discharging the lubricant outwardly therefrom.

6. A lubricating system for mechanism for driving in opposite directions two propellers 14, 13 mounted adjacently at the respective ends of inner and outer coaxial shafts 7, 10 that have a bearing 16 between them near the propeller ends of the shafts; the same comprising a longitudinal supply passage 21 exterior to the inner shaft for conducting lubricant from the drive end of the mechanism to said bearing, and therebeyond an annular chamber receiving the lubricant from the bearing, the inner wall of said chamber rotating with the inner shaft and its outer wall with the outer shaft, whereby the lubricant, by centrifugal force accumulates near the outer wall of the chamber and rotates therein as an annular liquid body in the same direction as the outer shaft rotation, a scoop or tapping device 23 rotating with the inner shaft, oppositely to the annular body of lubricant, and extending into the annular path of the lubricant in said chamber, with its outer portion or mouth disposed to scoop or tap lubricant from such annular body and force it centripetally from the chamber through a passage into the interior of the inner shaft, and a lubricant return passage 25 within said inner shaft, receiving lubricant from said scoop device and conducting it back toward the drive end of the mechanism.

7. The lubricating system as in claim 6 and wherein is a centrifugal forcing means comprising an outwardly extending passage 27 connected with said return passage and operating to draw lubricant therefrom, thereby to promote circulation through said bearing and chamber.

8. The lubricating system as in claim 6 and wherein the feed passage 21 is an annular passage between the coaxial propeller shafts.

9. The lubricating system as in claim 6 and wherein the propeller shafts are hollow, and the return passage 25 is provided in the bore of the inner shaft.

10. The lubricating system as in claim 6 and wherein the inner shaft has a central bore, with a liner or sleeve therein arranged concentrically to provide between the shaft and sleeve an annular passage constituting the return passage 25.

GIANNI CAPRONI.